(12) United States Patent
Mao et al.

(10) Patent No.: US 10,284,428 B2
(45) Date of Patent: May 7, 2019

(54) GRAPHICAL POLICY INTERFACE FOR NETWORK CONTROL SYSTEMS

(71) Applicant: FUJITSU LIMITED, Kawasaki-shi, Kanagawa OT (JP)

(72) Inventors: Kai Mao, Allen, TX (US); Hiroaki Komine, Yamato (JP); Takaaki Kawakami, Kawasaki (JP); Toshimasa Arai, Kawasaki (JP); Kenichi Sakurai, Kawasaki (JP); Minoru Takimoto, Chiba (JP)

(73) Assignee: FUJITSU LIMITED, Kawasaki (JP)

( * ) Notice: Subject to any disclaimer, the term of this patent is extended or adjusted under 35 U.S.C. 154(b) by 295 days.

(21) Appl. No.: 15/177,966

(22) Filed: Jun. 9, 2016

(65) Prior Publication Data

US 2017/0359377 A1 Dec. 14, 2017

(51) Int. Cl.
*H04L 29/06* (2006.01)
*H04L 12/24* (2006.01)

(52) U.S. Cl.
CPC .......... *H04L 41/0893* (2013.01); *H04L 41/14* (2013.01); *H04L 41/145* (2013.01); *H04L 41/22* (2013.01); *H04L 63/20* (2013.01)

(58) Field of Classification Search
CPC ....... H04L 63/20; H04L 41/14; H04L 41/145; H04L 41/22
See application file for complete search history.

(56) References Cited

U.S. PATENT DOCUMENTS

| | | | |
|---|---|---|---|
| 2016/0219078 A1* | 7/2016 | Porras | G06F 3/0484 |
| 2017/0126790 A1* | 5/2017 | Mortsolf | H04L 67/1002 |
| 2017/0222873 A1* | 8/2017 | Lee | H04L 41/0803 |
| 2017/0324781 A1* | 11/2017 | Hu | H04L 63/205 |
| 2017/0366416 A1* | 12/2017 | Beecham | H04L 41/12 |

OTHER PUBLICATIONS

Bari et al., "PolicyCop: An Automatic QoS Policy Enforcement Framework for Software Defined Networks", 7 pages (Year: 2013).*

* cited by examiner

*Primary Examiner* — Thaddeus J Plecha
(74) *Attorney, Agent, or Firm* — Baker Botts L.L.P.

(57) ABSTRACT

A graphical policy interface architecture may enable simplified graphical development of customized policy logic for software controllers to control network services, connections, and devices. The policy logic based on graphical policy logic notation may be compiled and installed at run-time into a software controller.

12 Claims, 9 Drawing Sheets

301-2     GRAPHICAL POLICY LOGIC NOTATION

GRAPHICAL POLICY INTERFACE FOR NETWORK CONTROL SYSTEMS

BACKGROUND

Field of the Disclosure

The present disclosure relates to communication networks, and more specifically, to a graphical policy interface for network control systems.

Description of the Related Art

As more applications are provided as networked services (referred to as "cloud applications") from data center infrastructure (referred to as "the cloud"), the cloud applications are executed on shared physical infrastructure and may be viewed as "tenants" in a multi-tenant cloud. For example, the cloud may represent distributed datacenter infrastructure that includes computing resources and intra-datacenter networks inside each datacenter, along with inter-datacenter optical networks connecting geographically dispersed datacenters. Virtualization of computing resources has emerged as a key technology for the cloud and may enable multiple tenants to efficiently share both computing and network resources.

Along with virtualization, software-based control of network services and functions has also become widespread using software controllers for implementing various network functionality. For example, software-defined networking (SDN) represents an important step towards network virtualization and abstraction and may allow for a logical network entity to be instantiated automatically using software instructions, rather than manually from user input. Due to complexities between software-based network control technologies and actual network provider operations, customization involved with each software controller may add complexity, cost, and delays for rolling out network services.

SUMMARY

In one aspect, a method for executing software controllers in networks is disclosed. The method may include, based on policy rules, using graphical policy notation to design a graphical policy logic for controlling a network using a software controller. The method may include compiling the graphical policy logic as a run-time module usable by a graphical policy executor to determine control logic within the software controller. The method may also include accessing the control logic by the software controller. In the method, the control logic may be determined at least in part by the run-time module. In the method, wherein the graphical policy executor may send actions based on the graphical policy logic to the software controller, the actions representing network commands for execution by the software controller, and receive events occurring in the network from the software controller.

In any of the disclosed embodiments, the method may further include receiving, at the graphical policy executor from an operator, control requests to control functionality at the network, generating the actions based on the control requests, and generating notifications for the operator, the notifications based on the events.

In any of the disclosed embodiments of the method, the run-time module including the graphical policy logic may be introduced to the software controller while the software controller is executing to control the network.

In any of the disclosed embodiments of the method, using graphical policy notation may further include using a graphical notation editor to design the graphical policy logic.

In any of the disclosed embodiments of the method, the graphical policy logic may be usable with a plurality of different software controllers.

In any of the disclosed embodiments of the method, the software controller supports a plurality of network protocols to communicate with the network.

Additional disclosed aspects include a network including a software controller for accessing control logic to control the network and a graphical policy executor, as described herein.

BRIEF DESCRIPTION OF THE DRAWINGS

For a more complete understanding of the present disclosure and its features and advantages, reference is now made to the following description, taken in conjunction with the accompanying drawings, in which.

DESCRIPTION OF PARTICULAR EMBODIMENT(S)

Figure 1:
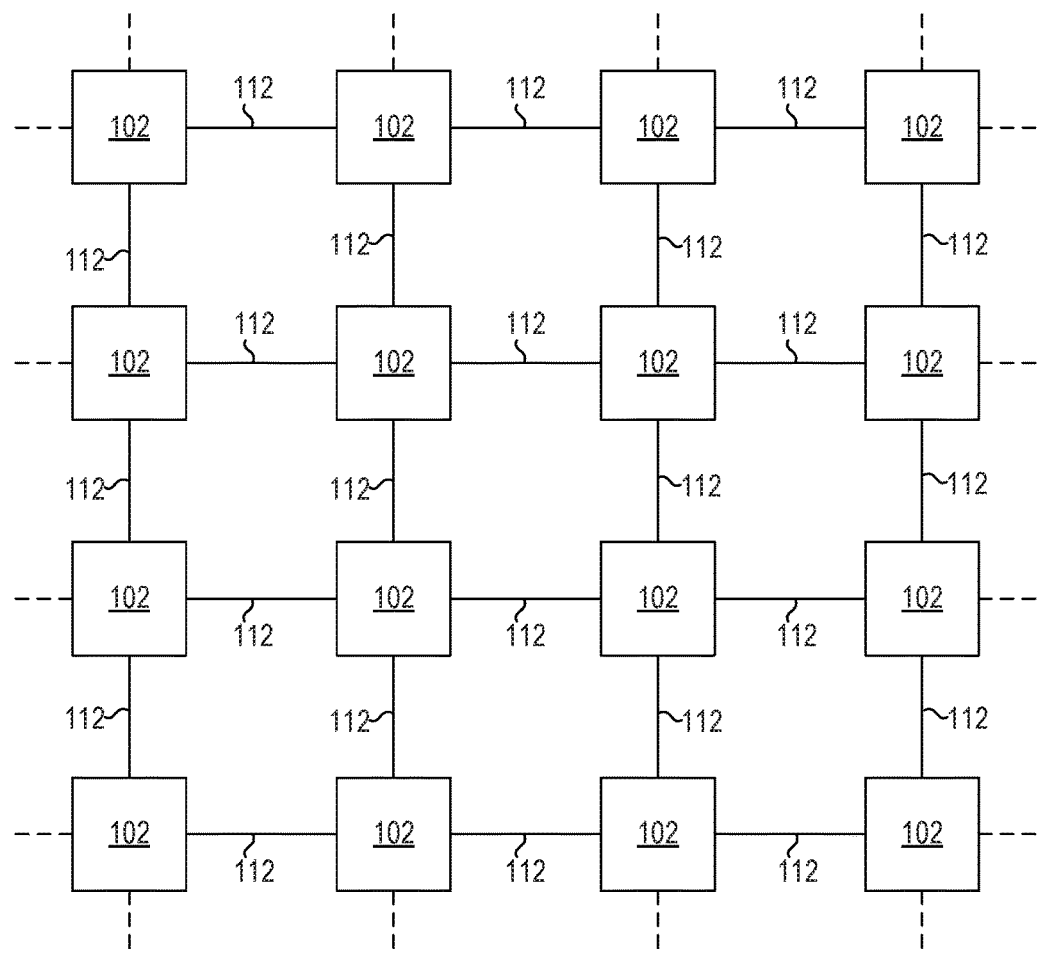
FIG. 1 is a block diagram of selected elements of an embodiment of a network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

As noted, software-based control of network services using software controllers for implementing various network functionality may still involve a significant degree of customization. For example, each software controller may rely upon specific customization to handle service definitions for various standards, such as multiprotocol label switching (MPLS), virtual local area networks (VLAN), and network virtualization using generic routing encapsulation (NVGRE), among others. Examples of software control systems that implement software-based controllers (or simply 'software controllers'), include software-defined networking (SDN) and network function virtualization (NFV) managers. Examples of commercial SDN software controllers include 6WINDGate (6WIND USA, Inc.), Arista EOS (Arista Networks, Inc.), Brocade Vyatta (Brocade Communication Systems, Inc.), Cisco APIC (Cisco Systems, Inc.), and Juniper NorthStar (Juniper Networks, Inc.), among others. The customization of such software controllers with control logic for use by a network operator to fulfill service requirements and support existing network technologies may involve weeks or months of hard-coded software development, even for the most advanced or sophisticated software controllers.

As will be described in further detail, a graphical policy interface for network control systems is disclosed herein that enables creation of intelligent policy logic through a simple visualization interface. The graphical policy interface for network control systems disclosed herein enables definition of control logic according to a desired policy using a graphical user interface (GUI) using graphical policy logic notation. The graphical policy interface for network control systems disclosed herein enables compilation of the graphical policy logic notation to compiled policy logic that may be integrated with a respective software controller. The compiled policy logic may be a run-time module that describes complex policy rule sets for supporting various network protocols, network devices, and external applications.

Turning now to the drawings, FIG. 1 is a block diagram showing selected elements of an embodiment of network 100. In certain embodiments, network 100 may be an Ethernet network. Network 100 may include one or more transmission media 112 operable to transport one or more signals communicated by components of network 100. The components of network 100, coupled together by transmission media 112, may include a plurality of network elements 102. In the illustrated network 100, each network element 102 is coupled to four other nodes. However, any suitable configuration of any suitable number of network elements 102 may create network 10. Although network 100 is shown as a mesh network, network 100 may also be configured as a ring network, a point-to-point network, or any other suitable network or combination of networks. Network 100 may be used in a short-haul metropolitan network, a long-haul inter-city network, or any other suitable network or combination of networks.

Each transmission medium 112 may include any system, device, or apparatus configured to communicatively couple network devices 102 to each other and communicate information between corresponding network devices 102. For example, a transmission medium 112 may include an optical fiber, an Ethernet cable, a T1 cable, a WiFi signal, a Bluetooth signal, and/or other suitable medium.

Network 100 may communicate information or "traffic" over transmission media 112. As used herein, "traffic" means information transmitted, stored, or sorted in network 100. Such traffic may comprise optical or electrical signals configured to encode audio, video, textual, and/or any other suitable data. The data may also be transmitted in a synchronous or asynchronous manner, and may transmitted deterministically (also referred to as 'real-time') and/or stochastically. In particular embodiments, traffic may be communicated via a suitable communications protocol, including, without limitation, the Internet Protocol (IP). Additionally, the traffic communicated via network 100 may be structured in any appropriate manner including, but not limited to, being structured in frames, packets, or an unstructured bit stream.

Each network element 102 in network 100 may comprise any suitable system operable to transmit and receive traffic and may provide a network service. In the illustrated embodiment, each network element 102 may be operable to transmit traffic directly to one or more other network elements 102 and receive traffic directly from the one or more other network elements 102.

Modifications, additions, or omissions may be made to network 100 without departing from the scope of the disclosure. The components and elements of network 100 described may be integrated or separated according to particular needs. Moreover, the operations of network 100 may be performed by more, fewer, or other components.

In operation, network 100 may be controlled using software controllers, as described previously. Specifically, devices in network 100 may be configured and programmed in network 100 using various network protocols by software controllers. The software controllers may support a graphical policy interface for network control systems, as disclosed herein.

Figure 2:
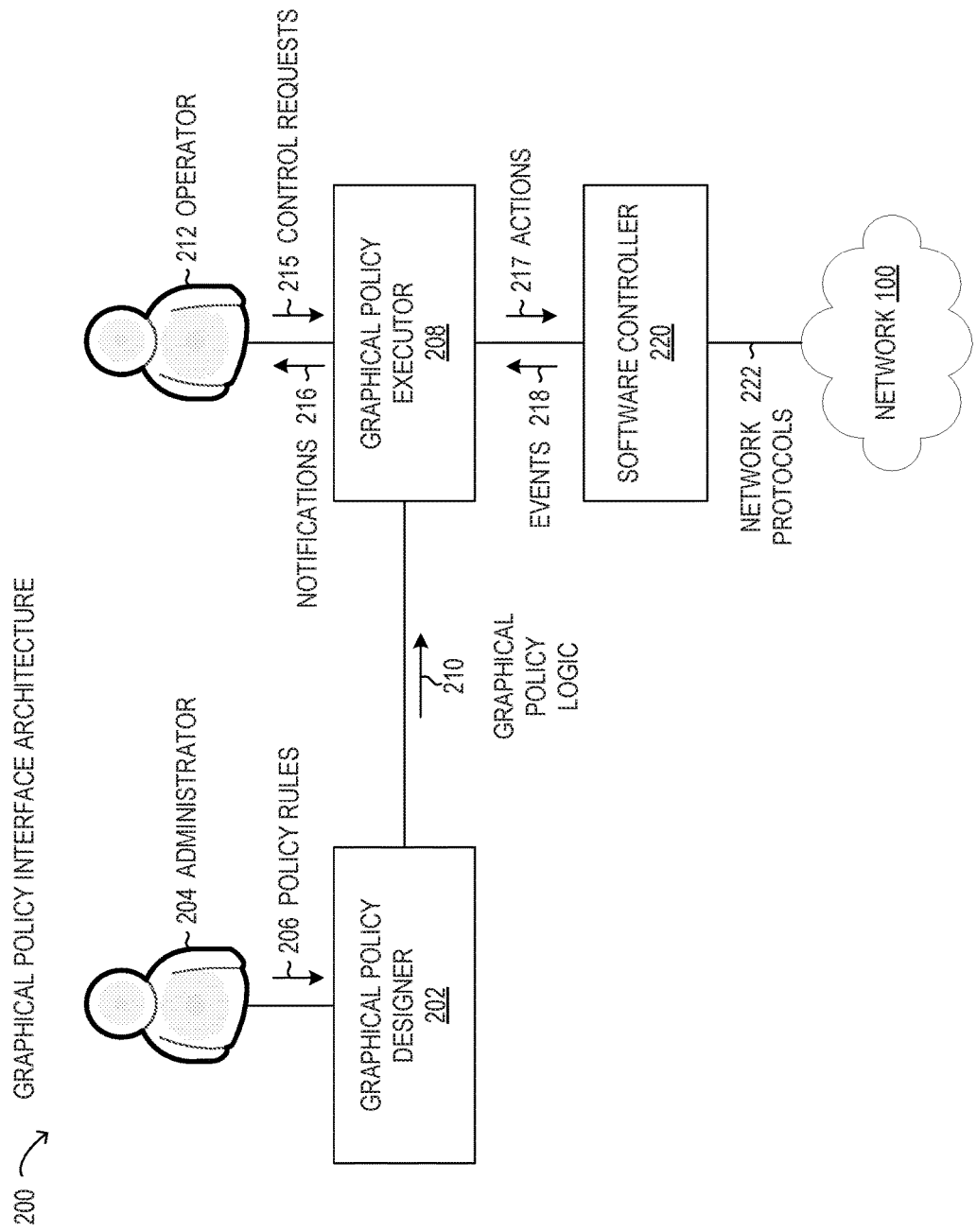
FIG. 2 is a block diagram of selected elements of an embodiment of a graphical policy interface architecture.

Referring now to FIG. 2, a block diagram of selected elements of an embodiment of a graphical policy interface architecture 200 is illustrated. Graphical policy interface architecture 200 in FIG. 2 may be implemented in network 100 (see FIG. 1) and is a schematic diagram for descriptive purposes.

As shown in FIG. 2, an administrator 204 may apply policy rules 206 to a graphical policy designer 202 to generate graphical policy logic 210. An example notation of graphical policy logic 210 is shown in FIG. 3. Policy rules 206 may define the desired behavior of software controller 220 within network 100. In this manner, procedures involved with any kind of network activity may be defined by policy rules 206.

In general, policy rules 206 may include various types of behavior within network 100. Certain exemplary types of behavior that may be specified by policy rules 206 are given in Table 1.

TABLE 1

Policy Rule Specifications for Example Network Behaviors

| Network Behavior | Specification in Policy Rules 206 |
| --- | --- |
| Event or Trigger | Evaluation and response based on the generating network activity, such as a provisioning request or a network alarm |
| Decision Condition | Evaluation and response based on defined criteria at decision time, such as which action to invoke if a certain threshold value was exceeded |
| Action | Execution of a defined function, procedure, or routine |
| Sequence Flow | Evaluation of policy logic that determines the order of processing events or triggers |

In many instances, graphical policy interface architecture 200 may be operated by a network operator providing network services to a customer. Various aspect of the network services provided to the customer may be specified by a service-level agreement (SLA) that specifies a desired service-level offered by the network operator, while costs and pricing for the network services may also be determined by the SLA that is agreed upon. Table 2 lists examples of network service SLA definitions that may be applied to network 100, or to a specified link within network 100, as an example. It is noted that Table 2 is an exemplary embodiment for descriptive purposes and that an actual SLA may include various other and different types of SLA Parameters not shown in Table 2.

TABLE 2

SLA Network Service Example

| SLA Parameter | Gold | Silver | Bronze |
|---|---|---|---|
| Data Rate | 10 GE | 10 GE | 1 GE |
| Maximum Latency | 100 ms | 200 ms | Best Effort |
| Reliability | Guaranteed | Shared Risk | Best Effort |

As shown in Table 2, which shows certain information associated with an SLA for descriptive purposes, the SLA parameters (Data Rate, Maximum Latency, Reliability) are specified for three different performance levels (Gold, Silver, Bronze). The Gold SLA network service definition in Table 2 specifies 10 Gigabit Ethernet data rate, 100 ms maximum latency, and a Guaranteed level of reliability indicating that a protected service with full protection switching, or another redundancy mechanism, has been enabled. The Silver SLA network service definition in Table 2 specifies 10 Gigabit Ethernet data rate, 200 ms maximum latency, and a Shared Risk level of reliability indicating that a lower protection level, with some risk of downtime, is involved and that the specified network link may incorporate at least some existing network links and may accordingly share backup risk with other network links. The Bronze SLA network service definition in Table 2 specifies 1 Gigabit Ethernet data rate, Best Effort latency, and a Best Effort level of reliability indicating an unprotected network service in which both latency and reliability are subject to the best efforts of the network operator for the specified network link.

Thus, the control logic behavior to implement the selected SLA definitions, as shown in the example of Table 2, may be given by policy rules 206. In other words, a customer SLA may be used to define particular policy rules 206. Specifically, the values of the SLA parameters may determine the type of connection (Data Rate), the routing of the connection (Maximum Latency) and the behavior of the connection (Reliability), among other parameters, which are captured by policy rules 206. For example, policy rules 206 may specify how the specified network link is provisioned in accordance with the corresponding SLA parameters, such as whether protected or unprotected network service is to be provisioned. In another example, policy rules 206 may specify how the specified network link reacts to a network event, such as whether or not a particular network even would trigger a recovery action or a notification action, such as whether a failure in the specified network link would automatically generate an alarm or initiate a protection switch event (for protected network service).

As noted Table 2 is an example of certain SLA parameters involved with network control and is shown for descriptive purposes. Thus, policy rules 206 may also define various aspects of network control for the specified network link. The extent of network control that policy rules 206 specify may be dependent upon the actual capabilities of the network (such as specific network equipment and devices) to which software controller 220 has access and visibility. Therefore, policy rules 206 may include different aspects of network control in particular embodiments and implementations. Some exemplary areas of network control that may be specified by policy rules 206, without limitation or exclusion, are given in Table 3.

TABLE 3

Policy Rule Specifications for Example Areas of Network Control

| Network Control | Specification in Policy Rules 206 |
|---|---|
| Shared Risk Links | Whether or not network links avoid existing provisioned network paths |
| Latency Performance | A performance standard for network links |
| Administrative Preference | Definition of certain operator domains, such as for billing purposes |
| Geographical Preference | Definition to use or avoid certain geographical regions to address right of way issues |
| Traffic Profile | Enforcement of traffic performance to maintain a desired quality of service, such as with regard to throughput, bandwidth, burstiness, priority |

Furthermore, policy rules 206 may comprise various layers of policy in addition to network control, which addresses network connectivity service. The additional layers of policy may relate to business decisions or preferences of the customer, such as how specific customer service requests are to be handled and responded to. In addition, policy rules 206 may specify device level provisioning services, such as how specific network equipment is to be configured and operated for the specified network link.

The functionality of software controller 220 may be represented as the procedures that are imported into graphical policy designer 202, and the procedure calls may represent application programming interfaces (APIs) for functions within software controller 220. Graphical policy designer 202 may be an application that enables generation of graphical policy logic 210 in graphical notation, for example, by including a graphical notation editor, as described in further detail below.

Then, in graphical policy interface architecture 200, graphical policy logic 210 may be compiled and sent to graphical policy executor 208 for execution. In some embodiments, graphical policy designer 202 may include a policy compiler to compile graphical policy logic 210. Graphical policy executor 208 may accordingly include a run-time environment that executes along with software controller 220 (see also FIGS. 3 and 6) to control functionality in network 100.

Figure 4:
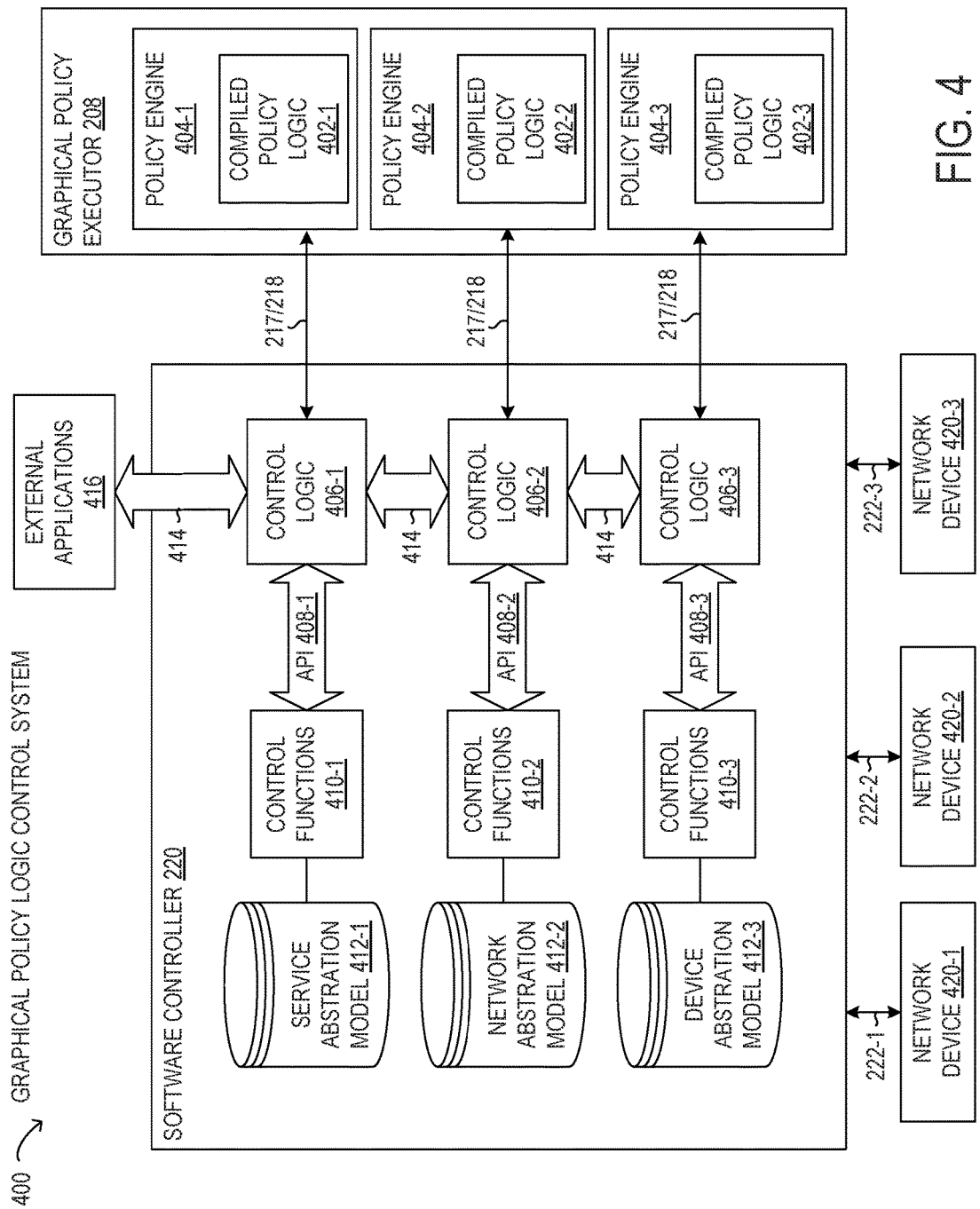
FIG. 4 is a block diagram of selected elements of an embodiment of a graphical policy logic control system.

The integration of graphical policy logic 210 with software controller 220 may be realized using different procedures and methodology (see also FIG. 4).

In a first exemplary embodiment of integrating graphical policy logic 210 with software controller 220, a standardized interface may be used. It is noted that various standards are being promulgated, such as by the Open Networking Foundation (ONF), that define information and data models for application programming interfaces (API) for various network functions. When graphical policy logic 210 (along with graphical policy designer 202 and graphical policy executor 208) and software controller 220 are compliant to the same standardized interface, software controller 220 will be compliant with graphical policy logic 210.

In a second exemplary embodiment of integrating graphical policy logic 210 with software controller 220, proprietary APIs for software controller 220 may be installed for use with graphical policy designer 202 and graphical policy executor 208. Thus, when graphical policy designer 202 and graphical policy executor 208 are used with software controller 220, the proprietary APIs associated with the particular software controller 220 may be loaded into, or made accessible to, graphical policy designer 202 and graphical policy executor 208, such as by the use of extensible markup language (XML) specifications. As a result, the proprietary APIs for software controller 220 become available and accessible to graphical policy designer 202 and graphical policy executor 208 for generating policy rules 206 and executing graphical policy logic 210. It is noted that some software controllers 220 support a representational state transfer (ReST) architecture style protocol, that typically relies on hypertext transfer protocol (HTTP) for communication. Thus, using a common interface, such as a ReST compliant interface, the proprietary APIs for software controller 220 may be directly invoked from graphical policy designer 202 and graphical policy executor 208.

In a third exemplary embodiment of integrating graphical policy logic 210 with software controller 220, custom system integration may be performed in the form of direct changes in source code of graphical policy designer 202 and graphical policy executor 208 to integrate the proprietary APIs for software controller 220. Once graphical policy designer 202 and graphical policy executor 208 have been customized in this manner, the proprietary APIs for software controller 220 may be directly invoked from graphical policy designer 202 and graphical policy executor 208.

As shown in FIG. 2, graphical policy executor 208 may be operated or monitored by operator 212, who may be responsible for network operations of network 100. In this capacity, operator 212 may send control requests 215 for control functionality to graphical policy executor 208. Based on graphical policy logic 210, graphical policy executor 208 may generate actions 217, representing specific network commands, for execution by software controller 220. As software controller 220 reports events 218 occurring at network 100, graphical policy executor may receive events 218 and may generate notifications 216 for viewing by operator 212. It is noted that graphical policy executor 208 may filter or process control requests 215 to generate actions 217, and may filter or process events 218 to generate notifications 216. In this manner, a policy workflow that is executed using graphical policy executor 208 and software controller 220 may replace hardcoded control logic that resides within software controller 220. Software controller 220 may further support and use network protocols 222 to communicate with specific devices or systems within network 100.

Figure 3A:
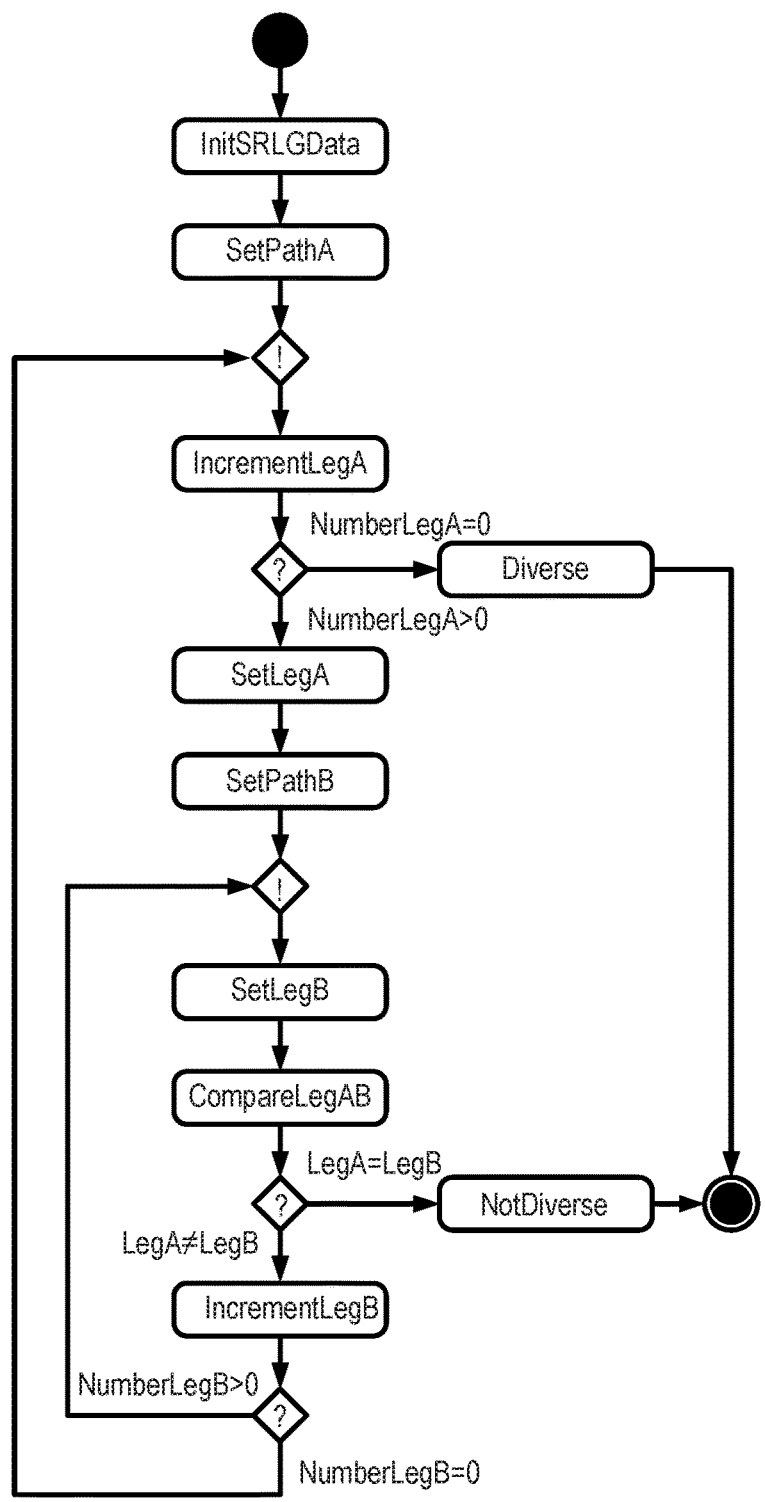
FIGS. 3A, 3B, 3C, and 3D are block diagrams of selected elements of embodiments of graphical policy logic notation.

Referring now to FIG. 3A, a block diagram of selected elements of an embodiment of a graphical policy logic notation 300-1 are shown. Graphical policy logic notation 300-1 may be generated using graphical policy designer 202, as described previously. For example, graphical policy designer 202 may include a graphical policy editor that supports graphical policy logic notation 300-1. As shown, graphical policy logic notation 300-1 represents a specific example of graphical policy logic notation that corresponds to actual program code shown below in Table 4 to determine whether two network paths (pathA and pathB), comprising individual legs, are diverse, indicating that there are no shared components or connections, and thus, no shared risks, between the paths. This kind of policy logic may be used in configuring or evaluating shared risk link groups (SRLG) for any two paths in network 100, and may be denoted as a CheckSRLG( ) function, for example. Specifically, policy rules 206 on which graphical policy logic notation 300-1 is based may include Reliability parameter, as shown in Table 2, which may specify guaranteed reliability for a gold level of service, and shared risk reliability for a silver level of service, as examples. Thus, when a gold or silver level of service is indicated, graphical policy logic notation 300-1 (representing a CheckSRLG( ) function) may allow a network link to be provisioned when the a 'Diverse' result is generated, and may block provisioning of the network link when a 'Not diverse' result is generated.

TABLE 4

Example code corresponding to graphical
policy logic notation 300-1 (FIG. 3A)

```
angular.module('test').service('SrlgService', [
    function( ) {
        this.checkSRLG = function(topology, slctPathIdxA,
            slctPathIdxB) {
            var result = {"rc":false, "diverse":"NO ALTERNATE
                PATH", "linkIdA":0,
"linkIdB":0 };
            var srlgListA = [ ];
            var srlgListB = [ ];
            var srlgA, srlgB;
            var idxA = 0;
            var idxB = 0;
            srlgListA = topology[slctPathIdxA].srlg;
            result.linkIdA = topology[slctPathIdxA].linkId;
            while (srlgListA.length > idxA) {
                srlgA = srlgListA[idxA];
                srlgListB = topology[slctPathIdxB].srlg;
                result.linkIdB = topology[slctPathIdxB].linkId;
                while (srlgListB.length > idxB) {
                    srlgB = srlgListB[idxB];
                    if (srlgA == srlgB) {
                        result.diverse = "NOT DIVERSE";
                        result.rc = false;
                        return result;
                    } else {
                        idxB++;
                    }
                }
                idxB = 0;
                idxA++;
            }
            result.diverse = "DIVERSE";
            result.rc = true;
            return result;
        };
    }
]);
```

The notation used in FIGS. 3A, 3B, 3C, and 3D may be based on a subset of business process model and notation (BPMN) using the symbols shown in Table 5 below.

TABLE 5

Graphical elements in graphical policy logic notation

| ELEMENT | DESCRIPTION | SYMBOL |
| --- | --- | --- |
| Action | Process definition containing policy operations or functions | ○ |
| Initial Node | Start of policy workflow | ● |
| Final Node | End of policy workflow | ● |
| Decision Node | Evaluation point in workflow, similar to IF or CASE statement | ◇ |
| Merge Node | Intersection point for multiple workflow branches | ◇ |
| Activity Edge | Workflow sequence definition, interconnection of other elements | ⟶ |

Thus, graphical policy logic notation 300-1 may begin at the initial node. At InitSLRGData action node, variable and other initialization may be performed, such as to define identifiers for pathA and pathB. At SetPathA action node, pathA may be selected. At IncrementLegA action node, legA in pathA may be incremented. After IncrementLegA, a decision may be made whether NumberLegA>0 indicating that additional legs are present in PathA. If no additional legs are present, a Diverse result may be generated. If additional legs are present, at SetLegA, legA is selected. At SetPathB, pathB is selected. At SetLegB, legB in pathB is selected. At CompareLegAB, legA is compared with legB. If LegA=LegB, then a Not Diverse result is generated. If LegA≠LegB, at IncrementLegB, LegB is incremented to the next leg in pathB. Then, based on NumberLegB>0 indicating that additional legs are present in PathB, execution may loop back as shown.

Figure 3B:
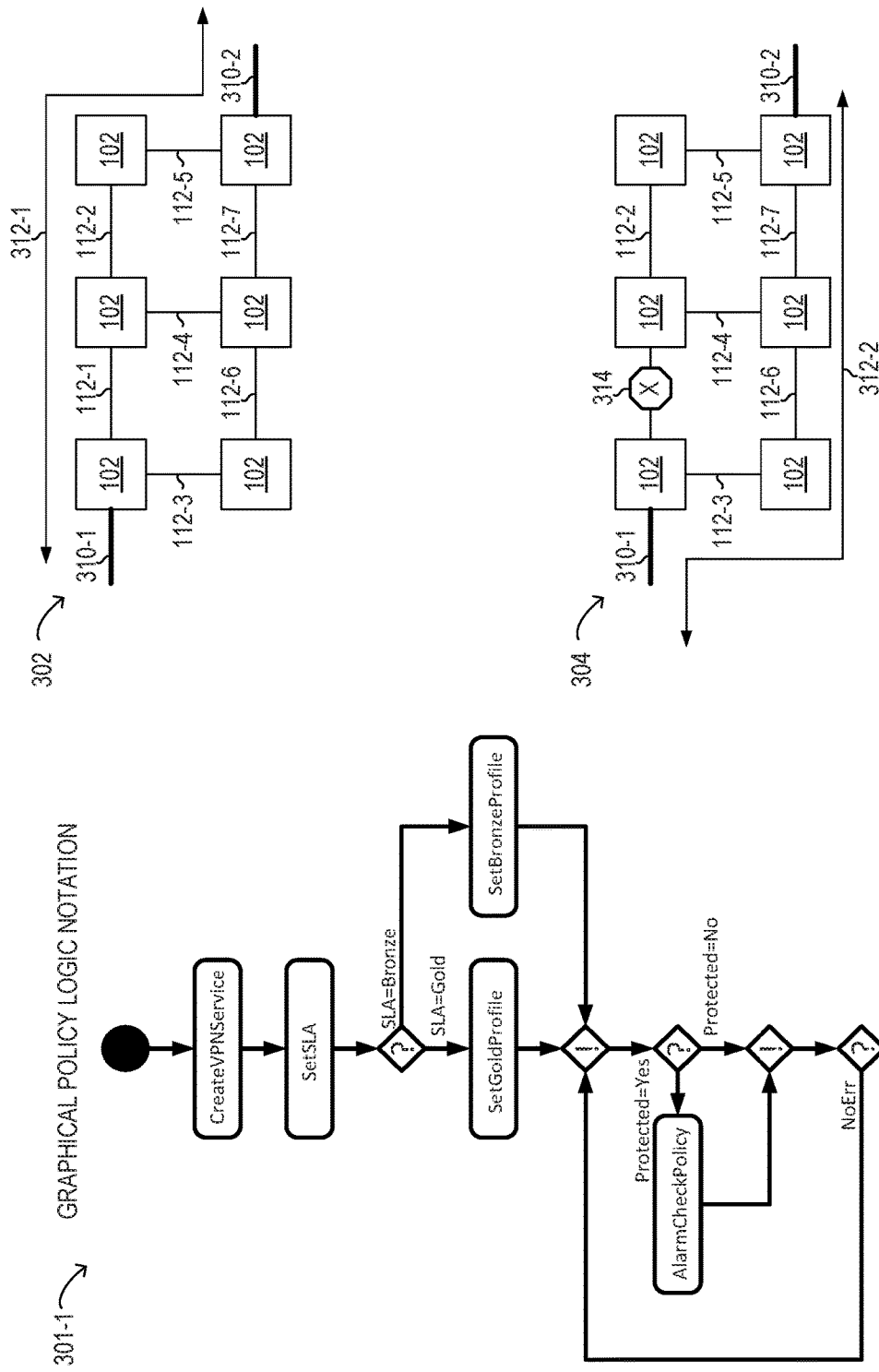
Figure 3C:
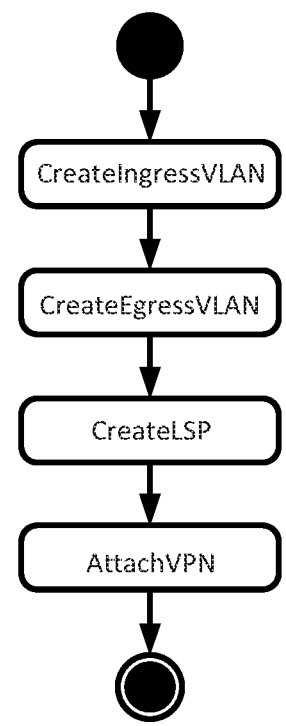
Figure 3D:
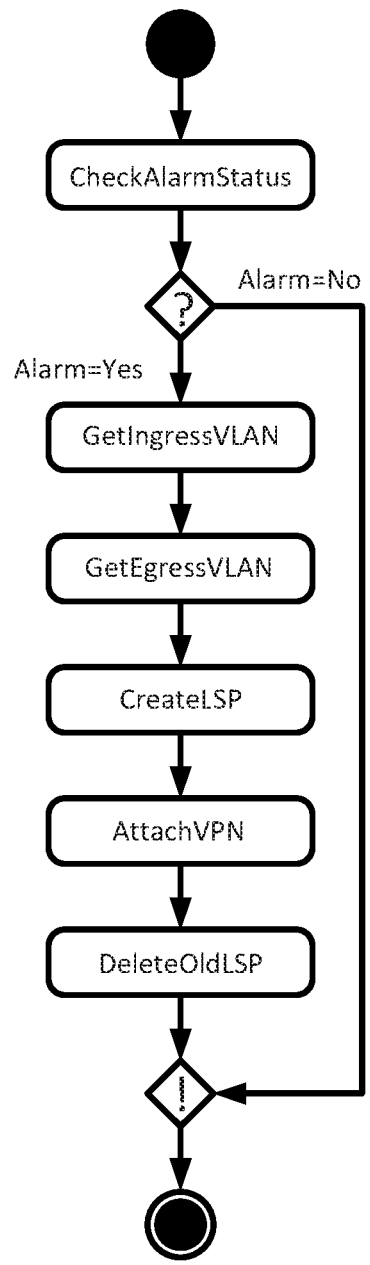

Referring now to FIGS. 3B, 3C, and 3D, a block diagram of selected elements of an embodiment of a graphical policy logic notation 301 are shown. In the example implementation of graphical policy logic notation 301, a network service use case for a virtual private network (VPN) being provided to a customer is described. It is noted that graphical policy logic notation 301 is an example for descriptive purposes and that in any given implementation different elements may be added or deleted.

Specifically, as shown in a network 302 in FIG. 3B, a network operator may provide a virtual private network (VPN) 312 as a network service to a customer. Network 302 may represent a portion of network 100 shown in FIG. 1. VPN 312 may be configured as a virtual local area network (VLAN) 310 having ingress at link 310-1 and egress at link 310-2 to customer locations. As shown in network 302, VPN 312-1 may initially be configured internally within network 302 as a multi-protocol label switching (MPLS) network having a label switched path (LSP) comprising links 112-1, 112-2, and 112-5. Furthermore, the network operator may offer two classes of VPN network service: gold and bronze. The gold class of VPN service may provide higher reliability and may maintain VPN 312 even when network failures occur, such as failures in links 112. The bronze level of VPN service may be a best effort service with no protection, that is, no redundant network links in case of a failure. For the purposes of establishing VPN 312 to provide VLAN 310 to the customer, the corresponding policy rules 206 may be defined according to graphical policy logic notation 301.

As shown in FIG. 3A, graphical policy logic notation 301-1 is a high level representation of the policy rules 206 with policy level actions and describes the main workflow including provisioning and maintenance functions for VPN 312. In FIG. 3B, graphical policy logic notation 301-2 is representation of policy rules 206 comprising actions that are controller functions for the high level action CreateVPNService in graphical policy logic notation 301-1. In FIG. 3C, graphical policy logic notation 301-3 is representation of policy rules 206 comprising actions that are controller functions for the high level action AlarmCheckPolicy in graphical policy logic notation 301-1.

In FIG. 3A, graphical policy logic notation 301-1 may begin with action CreateVPNService, which is explained in further detail in FIG. 3B. Then at action SetSLA, the SLA parameters for the client may be determined, after which a decision is made which level of service is specified. Based on either gold or bronze service levels, either SetGoldProfile or SetBronzeProfile actions are performed. Then a decision may be made whether the VPN service is protected. In this particular case, an SLA parameter may specify that protection is enabled, resulting in the action AlarmCheckPolicy being executed with Protection=Yes. Further details of AlarmCheckPolicy are explained in FIG. 3C. Then graphical policy logic notation 301-1 may continue with AlarmCheckPolicy as long as no error is detected.

Also in FIG. 3A, network 304 shows the configuration (or network state) after a network failure 314 occurs where link 112-1 was active. As a result of network failure 314 and the gold-level SLA being applied, VPN 312-1 may be automatically reconfigured to VPN 312-2 in network 304, now having a routing path through links 112-3, 112-6, and 112-7.

In FIG. 3B, graphical policy logic notation 301-2 shows further details for the CreateVPNService action shown in FIG. 3A. MPLS LSP is the transport protocol used to route and carry user traffic in network 302/304 for VPN 312. The customer endpoints of VPN 312 are configured as VLAN 310. CreateVPNService is the policy workflow for enforcing the VPN service definition by the network operator, shown in graphical policy logic notation 301-2. Graphical policy logic notation 301-2 may accordingly begin with CreateIngressVLAN which sets up ingress link 310-1 for VLAN 310 as a first customer attachment point to VPN 312. Then CreateEgressVLAN sets up egress link 310-2 for VLAN 310 as a second customer attachment point to VPN 312. Next, CreateLSP provisions the links for the MPLS LSP connections for VPN 312 shown in network 302. Finally, AttachVPN attaches the physical VLANs 310 and MPLS LSP connections to VPN 312-1.

In FIG. 3C, graphical policy logic notation 301-3 shows further details for the AlarmCheckPolicy action shown in FIG. 3A. First, with action AlarmCheckStatus, any network failures are queried and identified. If no network failure is detected (Alarm=No) in the form of an alarm, the procedure ends. It is noted that graphical policy logic notation 301-3 may be periodically executed as a result of looping logic defined in graphical policy logic notation 301-1 in FIG. 3A. When an alarm is detected (Alarm=Yes, such as due to network failure 314), at action GetIngressVLAN ingress link 310-1 for VLAN 310 is identified. At action GetEgressVLAN, egress link 310-2 for VLAN 310 is identified. At action CreateLSP, new MPLS LSP connections between links 310-1 and 310-2 are created, as shown by VPN 312-2. Then, AttachVPN attaches the physical VLANs 310 and the new MPLS LSP connections to VPN 312-2. Finally, at action DeleteOldLSP, the MPLS LSP connections for VPN 312-1 are deleted. The procedure described in graphical policy logic notation 301-3 may represent a protection switching event from VPN 312-1 to VPN 312-2 and may be seamlessly and automatically performed by software controller 220, once corresponding policy rules 206 have been defined and implemented as described herein.

Referring now to FIG. 4, a block diagram of selected elements of an embodiment of graphical policy logic control system 400 is illustrated. Graphical policy logic control system 400 in FIG. 4 may be implemented to control network 100 (see FIG. 1) and is a schematic diagram for descriptive purposes. Graphical policy logic control system 400 shows details of software controller 220 operating with graphical policy executor 208, as described above and in FIG. 6.

In FIG. 4, software controller 220 is shown including repositories that include three different abstraction models 412, selected as examples among other abstraction models for descriptive clarity. In some embodiments, abstractions models 412 are defined using YANG, which is a data modeling language for modelling configuration and state data used to manage network devices through a network configuration protocol (NETCONF). Specifically, service abstraction model 412-1 may model configuration and state data for network services used with network 100, network abstraction model 412-2 may model configuration and state data for network connections used with network 100, and device abstraction model 412-3 may model configuration and state data for network devices 420 used in network 100. Control functions 410-1 may represent various control functions for network services, control functions 410-2 may represent various control functions for network connections, and control functions 410-3 may represent various control functions for network devices 420, respectively. API 408-1 may enable control logic 406-1 to access control functions 410-1 for network services, API 408-2 may enable control logic 406-2 to access control functions 410-2 for network connections, and API 408-3 may enable control logic 406-3 to access control functions 410-3 for network devices 420, respectively.

As shown in graphical policy logic control system 400, API 414 may enable communication between control logic 406, as well as external applications 416. It is noted that API 414 may be internally defined within a particular software controller 220, or may be defined and integrated into graphical policy designer 202 and graphical policy executor 208, such that API 414 is accessible to compiled policy logic 402. Some non-limiting examples of external applications 416 that may be used with software controller 220 include orchestrators (NCX, Anuta Networks, Inc., Milpitas, Calif., USA; Exanova Service Intelligence, CENX, Ottawa, Canada), workflow managers (Salesforce Service Cloud, salesforce.com, Inc., San Francisco, Calif., USA; TrackVia, TrackVia, Inc., Denver, Colo., USA; Integrify, Integrify Inc., Chicago, Ill., USA); and analytics applications (Cloud Analytics Engine, Juniper Networks, Inc., Sunnyvale, Calif., USA; Nuage Networks Virtualized Services Directory (VSD), Nokia Solutions and Networks Oy, Espoo, Finland) .s As described in detail above, API 408 may comprise proprietary APIs for software controller 220 that have been integrated with graphical policy designer 202 and graphical policy executor 208 to enable compiled policy logic 402 (based on graphical policy logic 210) to invoke control functions 410.

In implementations of a conventional software controller (not shown), internal control logic is typically hardcoded with the desired functionality and is not externally accessible. However, in graphical policy logic control system 400 shown in FIG. 4, compiled policy logic 402 may govern desired operation of control logic 406, at least in part. In some embodiments, compiled policy logic 402, as defined by policy rules 206 described in detail above, may command the entire functionality of control logic 406. In various embodiments, control logic 406 may comprise internal control logic that remains proprietary, internal, or administratively protected within software controller 220. Non-limiting examples of internal or protected portions of control logic 406 may include complex proprietary algorithms, such as for path computation, and private business logic, such as billing algorithms of the network operator.

Furthermore, compiled policy logic 402 may represent run-time modules that can be installed at run-time for use with software controller 220. As used herein, 'run-time' may refer to a state when software controller 220 is executing to control the network. Because compiled policy logic 402, policy engine 404, and graphical policy executor 208 may support multiple different types of software controllers, complied policy logic, representing graphical policy logic, may be usable with a plurality of different software controllers of different types in different kinds of networks.

Graphical policy executor 208 may include one or more policy engines 404 that may execute a particular compiled policy logic 402, which communicates with control logic 406 via actions 217 and events 218, as described above. As shown, policy engine 404-1 may execute compiled policy logic 402-1 pertaining to network services, policy engine 404-2 may execute compiled policy logic 402-2 pertaining to network connections, and policy engine 404-3 may execute compiled policy logic 402-3 pertaining to network devices 420. It is noted that policy engine 404 and actions 217 and events 218 are shown in a logical view in FIG. 4 not a physical view. The actual physical connections between graphical policy executor 208 and software controller 220 may be different in different embodiments, such as using one or more network connections (not explicitly shown in FIG. 4).

Furthermore, software controller 220 may interact with various network devices 420 using different network protocols. For example, software controller 220 may interact with network device 420-1 using software protocol 222-1 that is a NETCONF protocol, with network device 420-2 using software protocol 222-2 that is a command line interface (CLI), and with network device 420-3 using software protocol 222-3 that is a simple network management protocol (SNMP). Network devices 420 may represents routers, switches, or network elements 102 that are included in network 100. As noted above, network abstraction models 412 may be repositories, such as databases with representations of functions supported by software controller 220, while the actual implementation of the functions is performed by control functions 410. Accordingly, control functions 410 may utilize the different network protocols 222 to access network devices 420.

It is noted that network devices 420 and software protocols 222 are shown in a logical view in FIG. 4 not a physical view. The actual physical connections between network devices 420 and software controller 220 may be different in different embodiments, such as using one or more network connections (not explicitly shown in FIG. 4).

Figure 5:
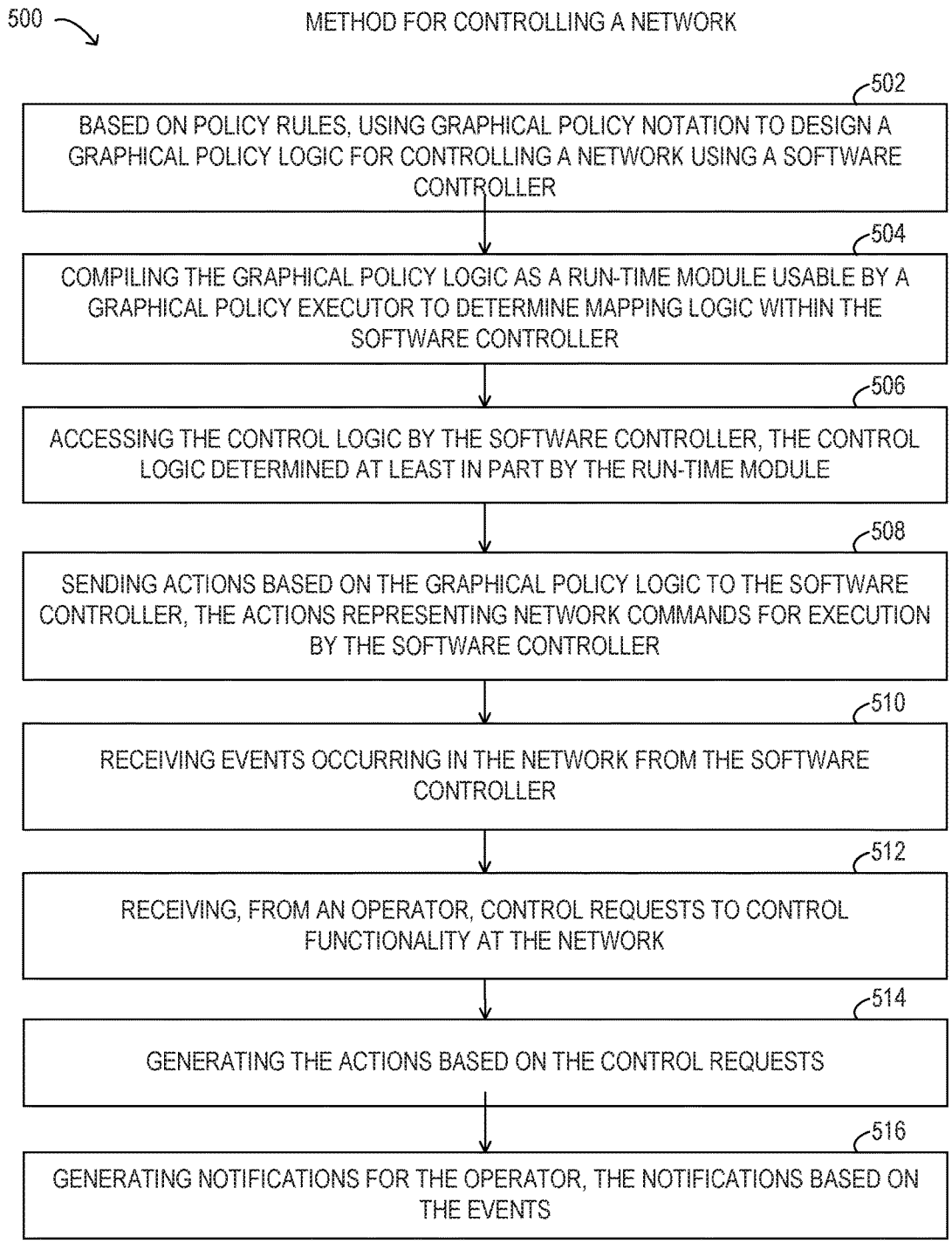
FIG. 5 is a flow chart of selected elements of an embodiment of a method for controlling a network.

Referring now to FIG. 5, a block diagram of selected elements of an embodiment of method 500 for controlling a network, as described herein using a graphical policy interface for network control systems, is depicted in flowchart form. At least certain operations in method 500 may be performed using graphical policy interface architecture 200 (see FIG. 2. It is noted that certain operations described in method 500 may be optional or may be rearranged in different embodiments.

Method 500 may begin by, based on policy rules, at step 502, using graphical policy notation to design a graphical policy logic for controlling a network using a software controller. At step 504, the graphical policy logic is compiled as a run-time module usable by a graphical policy executor to determine control logic within the software controller. At step 506, the control logic is accessed by the software controller, the control logic determined at least in part by the run-time module. At step 508, actions based on the graphical policy logic are sent to the software controller, the actions representing network commands for execution by the software controller. At step 510, events occurring in the network are received from the software controller. At step 512, control requests are received from an operator to control functionality at the network. At step 514, the actions based on the control requests are generated. At step 516, notifications for the operator are generated, the notifications based on the events.

Figure 6:
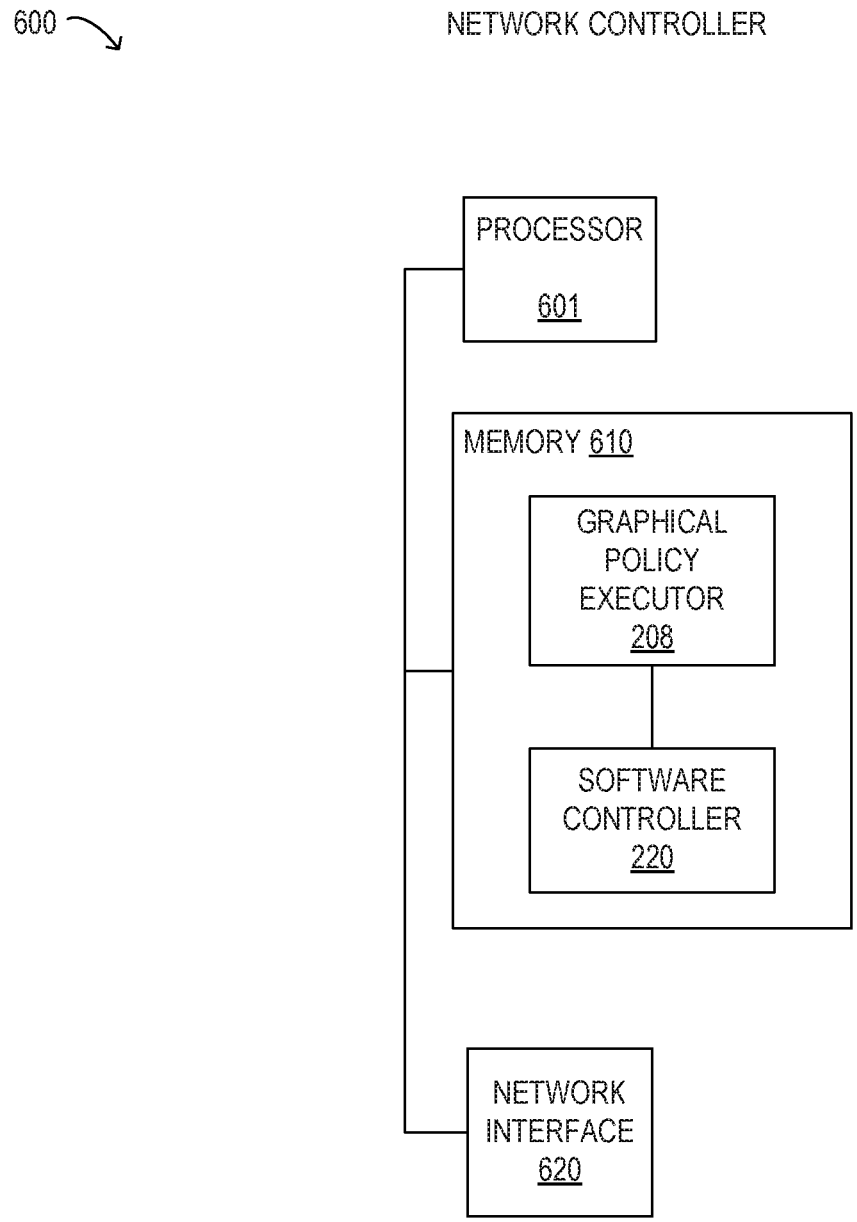
FIG. 6 is a block diagram of selected elements of an embodiment of a network controller.

Referring now to FIG. 6, a block diagram of selected elements of an embodiment of network controller 600 is illustrated. In FIG. 6, network controller 600 is represented as a computer system including physical and logical components for implementing graphical policy interface architecture 200, as described herein, and may accordingly include processor 601, memory 610, and network interface 620. Processor 601 may represent one or more individual processing units and may execute program instructions, interpret data, process data stored by memory 610 or network controller 600. It is noted that network controller 600 may be implemented in different embodiments. For example, in some embodiments, network controller 600 may be implemented using network element 102 (see FIG. 1). In particular embodiments, memory 610 may represent a software controller 220 executing on processor 601 using graphical policy executor 208, as described above.

In FIG. 6, memory 610 may be communicatively coupled to processor 601 and may comprise a system, device, or apparatus suitable to retain program instructions and/or data for a period of time (e.g., computer-readable media). Memory 610 may include various types components and devices, such as random access memory (RAM), electrically erasable programmable read-only memory (EEPROM), a PCMCIA card, flash memory, solid state disks, hard disk drives, magnetic tape libraries, optical disk drives, magneto-optical disk drives, compact disk drives, compact disk arrays, disk array controllers, or any suitable selection or array of volatile or non-volatile memory. Non-volatile memory refers to a memory that retains data after power is turned off. It is noted that memory 610 may include different numbers of physical storage devices, in various embodiments. As shown in FIG. 6, memory 610 may include graphical policy executor 208 and software controller 220, as described above.

As disclosed herein, a graphical policy interface architecture may enable simplified graphical development of customized policy logic for software controllers to control network services, connections, and devices. The policy logic based on graphical policy logic notation may be compiled and installed at run-time into a software controller.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for executing software controllers in networks, the method comprising:
   based on policy rules, using graphical policy notation to design a graphical policy logic for controlling a network using a software controller;
   compiling the graphical policy logic as a run-time module usable by a graphical policy executor to determine control logic within the software controller; and
   accessing the control logic by the software controller, wherein the control logic is determined at least in part by the run-time module,
   wherein the graphical policy executor,
      sends actions based on the graphical policy logic to the software controller, the actions representing network commands for execution by the software controller; and
      receives events occurring in the network from the software controller.

2. The method of claim 1, further comprising:
   receiving, at the graphical policy executor from an operator, control requests to control functionality at the network;
   generating the actions based on the control requests; and
   generating notifications for the operator, the notifications based on the events.

3. The method of claim 1, wherein the run-time module comprising the graphical policy logic is accessed by the software controller while the software controller is executing to control the network.

4. The method of claim 1, wherein using graphical policy notation further comprises:
   using a graphical notation editor to design the graphical policy logic.

5. The method of claim 1, wherein the graphical policy logic is usable with a plurality of different software controllers.

6. The method of claim 1, wherein the software controller supports a plurality of network protocols to communicate with the network.

7. A network comprising:
   a software controller for accessing control logic to control the network; and
   a graphical policy executor for,
   receiving a graphical policy logic as a run-time module usable by the graphical policy executor to determine the control logic within the software controller, wherein the graphical policy logic is designed based on policy rules using graphical policy notation, and wherein the control logic is determined at least in part by the run-time module;
   sending actions based on the graphical policy logic to the software controller, the actions representing network commands for execution by the software controller; and
   receiving events occurring in the network from the software controller.

8. The network of claim 7, wherein the graphical policy executor further:
   receives, from an operator, control requests to control functionality at the network;
   generates the actions based on the control requests; and
   generates notifications for the operator, the notifications based on the events.

9. The network of claim 7, wherein the run-time module comprising the graphical policy logic is accessed by the software controller while the software controller is executing to control the network.

10. The network of claim 7, wherein using graphical policy notation further comprises:
    using a graphical notation editor to design and compile the graphical policy logic.

11. The network of claim 7, wherein the graphical policy logic is usable with a plurality of different software controllers.

12. The network of claim 7, wherein the software controller supports a plurality of network protocols to communicate with the network.

* * * * *